Figures 1, 2:
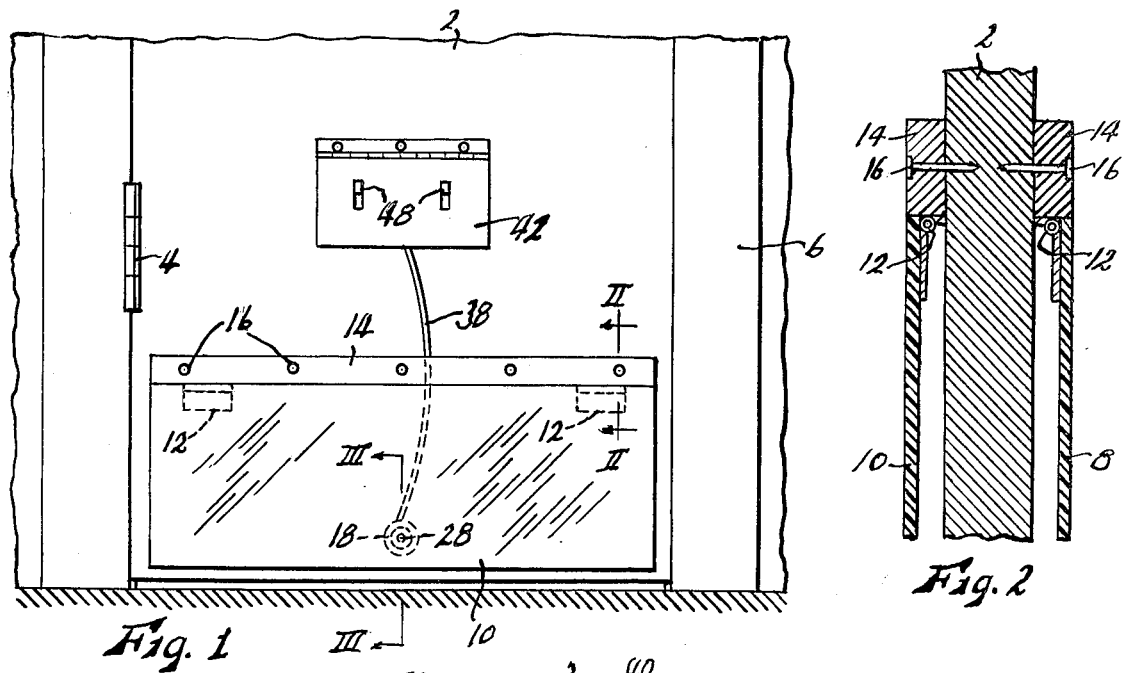

United States Patent [19]

Sowards

[11] 4,323,883
[45] Apr. 6, 1982

[54] DOORBELL FOR PETS

[76] Inventor: Lorin F. Sowards, P.O. Box 85, Brownville, Nebr. 68321

[21] Appl. No.: 221,546

[22] Filed: Dec. 31, 1980

[51] Int. Cl.³ .............................................. G08B 3/00
[52] U.S. Cl. ..................................... 340/328; 200/86.5
[58] Field of Search ...................... 340/326, 328, 327; 200/86.5, 85, 61.81, 61.62

[56] References Cited

U.S. PATENT DOCUMENTS

| | | | |
|---|---|---|---|
| 2,909,771 | 10/1959 | Minnich | 340/327 |
| 3,031,546 | 4/1962 | Williams | 200/61.62 |
| 3,964,058 | 6/1976 | Winston | 340/326 |
| 3,991,415 | 11/1976 | Baar, Sr. | 340/326 |

Primary Examiner—Donald J. Yusko
Attorney, Agent, or Firm—John A. Hamilton

[57] ABSTRACT

A doorbell for pets consisting of a pair of scratch plates adapted to be hung movably respectively on the inner and outer surfaces of a door of a house or other building for yieldable movement toward said door under the impetus of a pet's scratching thereagainst, and an electrical system including an audible signalling device operable by switches mounted in the door and actuated by said scratch plates. Provision is made for maintaining operation of the signalling devices for any desired length of time despite merely momentary movements of the scratch plates, and for adjusting the force required to actuate the signals, both to prevent accidental operation by blowing wind, and to accommodate the device to pets of different sizes and strengths. The signals may be audibly distinguishable, to indicate whether the animal desires ingress or egress.

8 Claims, 4 Drawing Figures

U.S. Patent

Apr. 6, 1982

4,323,883

DOORBELL FOR PETS

This invention relates to new and useful improvements in doorbells, and particularly to a type of doorbell suitable for use by dogs, cats or other pets to indicate if they desire ingress or egress to or from a residence or other building, in order to alleviate any necessity of leaving doors open for their use, which is wasteful in energy costs in inclement weather, and dangerous from the standpoint of security.

The principal object of the present invention is the provision of a doorbell of the character described which takes advantage of the natural characteristic of animals to scratch or paw at a closed door whenever they desire to pass therethrough. To this end, the present invention includes a planar scratch plate covering substantially the entire area of a door at which the animal could scratch, having regard to its size and height and mounted on the door for yieldable movement toward the door, and means operable by this movement to actuate an audible signalling device.

Many animals will normally exert pressure on a scratch plate only for periods of very short duration, thereby causing correspondingly short, sharp periods of operation of the signal device, which may be difficult for the human occupants to hear from remote parts of the building. Accordingly, another object is the provision of a device of the character described including means operable to hold and maintain the signal device in operation for any desired length of time despite only momentary movement of the scratch plate. It will shut the signal off if anything should become lodged against the scratch plate, but will give periodic warnings thereafter until the obstruction has been cleared.

Since the scratch plate must be of quite substantial area, it may act as a sail when the wind blows, operating the signal accidently if the wind is sufficiently strong. Accordingly, another object is the provision of a device of the character described including means operable to adjust the degree of pressure on the scratch plate required to actuate the signal. In addition to adjusting for windage, this means may be used to accomodate the device for use by animals of different sizes and strengths.

A further object is the provision of a device of the character described including a pair of scratch plates mounted respectively at the inner and outer surfaces of a door, in order that an animal may indicate whether he desires ingress or egress. In this case the two plates may actuate separate signal devices, which may be audibly distinguishable.

Other objects are simplicity and economy of construction, and efficiency and dependability of operation.

Figure 3:
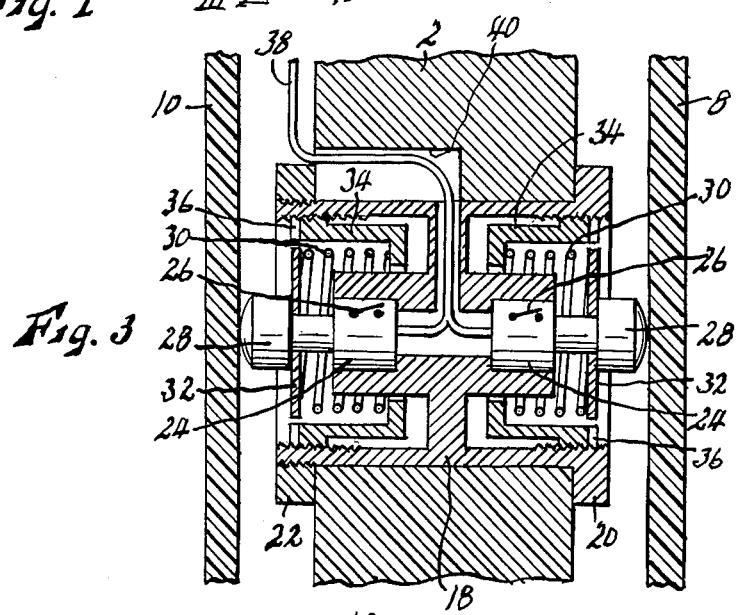
Figure 4:
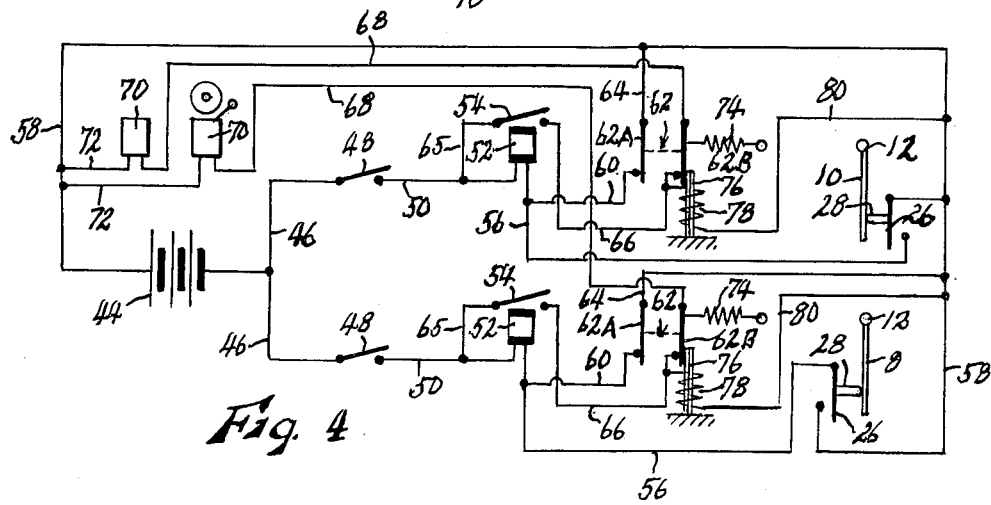

With these objects in view, as well as other objects which will appear in the course of the specification, reference will be had to the accompanying drawing, wherein:

FIG. 1 is an elevational view of the lower portion of a building door, showing a doorbell for pets as contemplated by the present invention mounted operatively thereon, FIG. 2 is an enlarged, fragmentary sectional view taken on line II—II of FIG. 1, FIG. 3 is an enlarged, fragmentary sectional view taken on line III—III of FIG. 1, and FIG. 4 is a schematic wiring diagram of the device.

Like reference numerals apply to similar parts throughout the several views, and the numeral 2 applies to a door of a building, said door being hinged at 4 in a door frame 6, all in an ordinary manner. A pair of plates 8 and 10, formed of plastic as shown, or any other suitable material, are disposed respectively adjacent the outer and inner surfaces of said door at the lower portion thereof, the planes of said plates normally being parallel to the door plane but spaced slightly outwardly therefrom, as shown in FIG. 2. The plates should be substantially as wide as the door opening, and extend at least as high on the door as a pet will normally be able to scratch on it, in order to cover the full area of the door against which an animal may exert pressure. Each of the scratch plates is hinged along its horizontal upper edge, as at 12, to a mounting strip 14, which may be wood, and which is affixed to the corresponding face of the door as by nails 16. Thus each scratch plate is suspended to hang vertically in slightly spaced apart relation to the door. It may swing inwardly toward the door, but cannot be swung outwardly due to the abutment of its upper edge with strip 14, as might otherwise occur if wind blew between the plate and the door, particularly the outdoor plate 8.

An electric switch housing 18 is mounted in door 2 within the areas of plates 8 and 10, preferably adjacent the lower edges thereof. It extends through the door normally thereto, being affixed therein by a flange 20 at the outer end thereof and a nut 22 threaded thereon at its inner end. Press fitted in sockets provided therefor in the respectively opposite end portions of housing 18 is a switch case 24, each of said cases containing a normally open electric switch 26 operable to be closed by inward pressure on a pushbutton 28 projecting outwardly from case 24 to a point spaced outwadly from the associated outer or inner face of door 2, the pushbutton 28 of one switch engaging outer scratch plate 8, and the pushbutton of the other switch engaging inner scratch plate 10, so that movement of each scratch plate toward the door causes closure of its associated switch 26. Movement of each pushbutton is resisted by yieldably by a compression spring 30 abutting at its outer end against a washer 32 fixed on the pushbutton and at its inner end against an outwardly facing flange of a sleeve 34 threaded axially into housing 18. By turning said sleeves, for which purpose they are provided with screwdriven slots 36, adjustment may be made of the force which must be applied to either of scratch plates 8 or 10 in order to cause closure of the associated switch 26. The electrical lead wires for switches 26 are gathered into a cable 38 which extends from housing 18 through an opening 40 to the inner side of door 22, and thence to a control box 42 which may conveniently be mounted on the inner side of the door. The remaining electrical components of the system may be mounted in said box.

The system includes a source of electrical power, which may constitute a battery 44, from which an operating circuit is completed through line wire 46, a manually operable on-off switch 48, wire 50, the coil 52 of a normally open relay 54, wire 56, and one of switches 26 to return wire 58. The circuits for both of switches 26 are identical, and the elements thereof are indicated by corresponding numerals, Thus, if either of switches 48 has been closed to activate the switch 26 associated with either of scratch plates 8 and 10, inward movement of that plate will close switch 26 to close the associated relay 54. This closure may be extremely intermittent, due to the characteristic scratching motion of many animals. However, even momentary activation of coil 52 also completes a holding circuit from wire 56 through wire 60, one pole 62A of a normally closed double-pole relay 62 also having a pole 62B, and wire 64 to return wire 58, so that coil 52 remains energized, and relay 54 closed, as long as relay 62 remains closed.

Closure of relay 54 completes a circuit from wire 50 through wire 65, said relay, wire 66, pole 62B of relay 62, wire 68, an audible signal device 70 such as a bell or buzzer, and wire 72 to return wire 58. Thus either signal device operates as long as the associated relays 54 and 62 remain closed. The two signal devices, which are associated respectively with scratch plates 8 and 10, should preferably be audibly distinguishable, such as by using a bell for one and a buzzer for the other, in order to indicate clearly which plate has been activated.

Relay 62 is normally closed, being biased toward an open position by a spring 74 but held closed against the bias of said spring by a bimetallic element 76, which may be heated by a heater coil 78 to cause it to bend to allow the relay to open. Said heater coil is energized by the closure of relay 54, by a circuit from said relay through wire 66, heater coil 78 and wire 80 to return wire 58.

In operation, it will be seen that if a dog, cat or other pet, scratches or paws at plate 8 to indicate that he desires ingress to the house, or at plate 10 to indicate that he desires egress, that plate will be moved toward the door against its spring 30 to close the associated switch 26. The pressure required to close the switch may be adjusted by turning sleeve 34 thereof with a screwdriver. This adjustment accomodates the device for use by animals of different sizes, in that if spring 30 is stiffened to the point that only a large dog, for example, could press hard enough to close switch 26, then it could not be closed by a smaller dog or a cat. This adjustment may also be used to so stiffen spring 30 that the force of wind blowing against a scratch plate, in this case outer plate 8, cannot cause accidental closure of switch 26.

Closure of either switch 26 closes the associated relay 54, and the closure of relay 54 functions through relay 62 both to establish a holding circuit maintaining relay 54 closed and also to activate the associated signal device 70. The signal devices should be audibly distinguishable to indicate clearly to a listener either that a pet is outside and wants to come in, or is inside and wants to go out. The holding circuit is operable to produce continuous operation of the signal device for any desired period of time necessary to reliably inform human occupants of the house of the pet's desires. This compensates for the fact that the characteristic scratching motions of most animals would otherwise produce only extremely short, erratic bursts of operation of the signal, which might go unnoticed.

The signal continues in operation until relay 62 is opened by operation of heater coil 78, at which time it both interrupts the circuit of the signal device, and also interrupts the holding circuit maintaining relay 54 closed, so that the latter opens and the entire system is rendered inactive until one of switches 26 is again closed. Relay 62 actually constitutes a delayed-opening switch, and while it is illustrated as of a thermal type, other suitable types could be used. Such switches are readily available to provide any desired delay period. If some object should accidentally become lodged against either of plates 8 or 10 to hold the associated switch 26 closed, operation will proceed through the described sequence, but relay 62 will thereafter periodically close and open, as bimetallic element 76 is alternately cooled to close the relay to initiate the signal, and heated by coil 78 to reopen to interrupt the signal. This provides a special signal, that is, a signal of different periodicity, to indicate to any listener that the obstruction to free movement of plate 8 or plate 10 should be cleared.

While I have shown and described a specific embodiment of my invention, it will be apparent that many minor changes of structure and operation could be made without departing from the spirit of the invention.

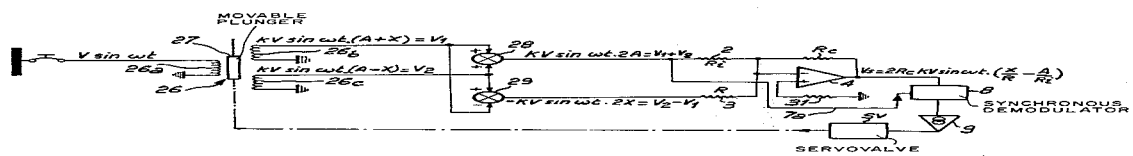

What I claim as new and desire to protect by Letters Patent is:

1. A doorbell for pets comprising:
   a. a scratch plate,
   b. means supporting said plate on a building door for movement toward said door, the plane of said plate normally being parallel to but spaced apart from said door, and against which a pet desiring passage through said door may scratch to move it toward said door,
   c. an electrical switch mounted on said door and operable to be closed by movement of said scratch plate toward said door, and
   d. an operative electrical circuit including said switch, an electrically operated signalling device, and a source of electric power.

2. A device as recited in claim 1 wherein said scratch plate mounting means is operable to prevent movement of said scratch plate outwardly from said door, while still permitting movement thereof toward said door.

3. A device as recited in claim 1 wherein said supporting means for said scratch plate comprises:
   a. a mounting strip affixed to said door, and
   b. hinges connecting said scratch plate to said mounting strip for pivotal movement on a horizontal axis parallel to said door at the upper edge of said plate, said mounting strip being configurated to abut said plate to prevent movement of said plate outwardly from said door.

4. A device as recited in claim 1 with the addition of means operable to adjust the degree of pressure which must be exerted by an animal against said scratch plate to close said electrical switch.

5. A device as recited in claim 1 wherein said electrical switch includes a pushbutton positioned to be engaged by said scratch plate, and depressible, by movement of said scratch plate to close said switch, and with the addition of:
   a. spring means yieldably resisting depression of said pushbutton, and
   b. means operable to adjust the tension of said spring means, whereby to adapt the device for use by larger or smaller animals.

6. A device as recited in claim 1 wherein said operative electrical circuit additionally includes means operable to maintain said signal device in operation for a predetermined relatively long period of time, whenever operation thereof is initiated by said electrical switch, depite relatively short periods of closure of said switch as occasioned by characteristic scratching motions of pets.

7. A device as recited in claim 1 wherein said operative electrical circuit comprises:
   a. a first circuit including said signal device and said electrical power source in series,
   b. a normally open first relay disposed in said first circuit,

| [52] | U.S. Cl. ............................. 340/347 DA; 318/657; 340/347 M |
| [58] | Field of Search .................... 340/347 M, 347 SY; 318/661, 569, 604, 656, 657 |

[56] References Cited

U.S. PATENT DOCUMENTS

| 3,071,324 | 1/1963 | Schroeder et al. ....... 340/347 SY X |
| 3,530,386 | 9/1970 | Terry .......................... 340/347 M |
| 4,099,245 | 7/1978 | Maysonett ............... 340/347 SY X |

The detector secondary windings are connected in parallel to one input of a summing circuit, through a first resistance of fixed value and through a second resistance of adjustable value, respectively. Means responsive to the transmitter digital control signals are provided to adjust the value of the second resistance. The output of the summing circuit is connected to the control circuit of the moving element.

5 Claims, 5 Drawing Figures